May 31, 1938.  W. KERN  2,119,332
COLD STORAGE CABINET
Filed Jan. 27, 1937

INVENTOR.
WILLIAM KERN
ATTORNEYS.

Patented May 31, 1938

2,119,332

UNITED STATES PATENT OFFICE 2,119,332

COLD STORAGE CABINET

William Kern, Ridgefield Park, N. J.

Application January 27, 1937, Serial No. 122,548

4 Claims. (Cl. 312—148)

The invention relates to cold storage cabinets and more particularly to that type thereof commonly used for containing supplies of ice cream and equivalent frozen confections intended to be selectively dispensed from said cabinets to consumers. The invention has for its object the provision of a cold storage cabinet of simple construction in which the commodities are easily accessible for dispensation and in which a proper interior temperature may be maintained with a minimum of refrigeration or its equivalent. The invention contemplates further the provision of a cabinet of compact form and dimensions having improved capacity and capable of being produced and maintained at relatively low cost. Other more specific objects will appear from the description hereinafter and the features of novelty will be pointed out in the claims.

Figure 1:
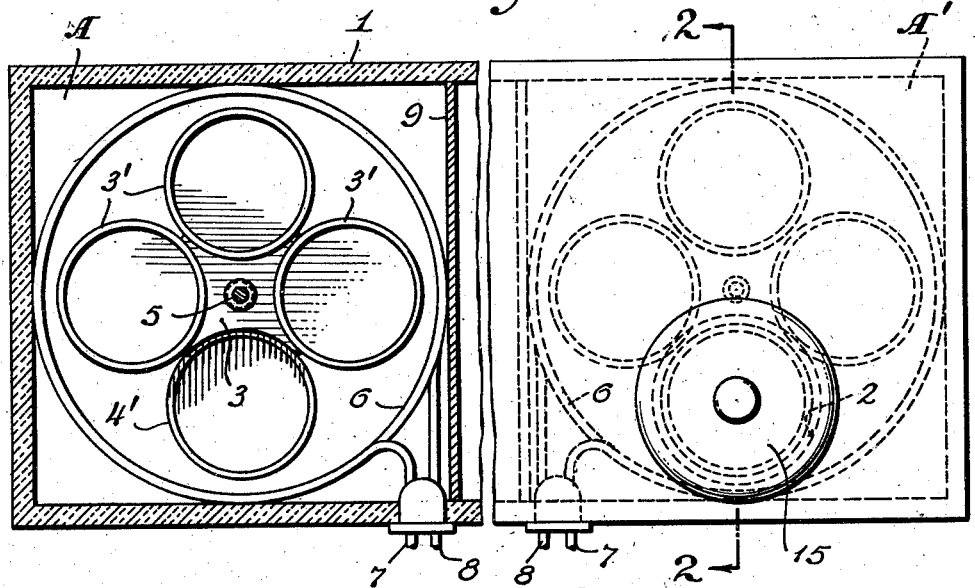
Figure 2:
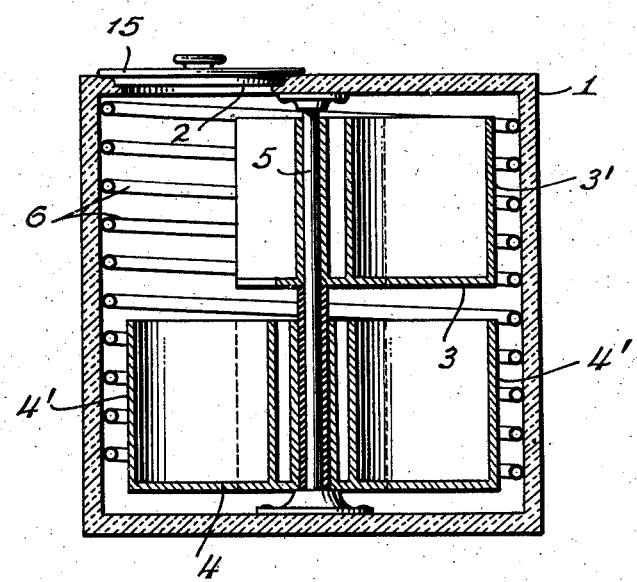

In the accompanying drawing, which illustrates an example of the invention without defining its limits, Fig. 1 is a plan view of the novel cabinet partly broken away and in section, and Fig. 2 is a sectional view thereof on the line 2—2 of Fig. 1.

As shown in the illustrated example, the cabinet comprises a casing 1 preferably of rectangular form and of any suitable dimensions, said casing being insulated with cork or otherwise in any conventional manner to reduce heat exchange between the atmosphere and the interior of the casing 1 to a minimum.

In the form of the cabinet selected for purposes of illustration and description, the casing 1 is provided with spaced interior partitions 9 which provide two end chambers A and A'; intermediate chambers may be provided between the end chambers A and A' where increased capacity is desired.

It will be understood that the two end chambers A and A', and the elements associated therewith, are duplicates of each other and that either one of them constitutes the essence of the invention; as a matter of fact, in some instances, either one of the chambers A or A', with its associated elements, may comprise the novel cabinet. For these reasons, it will be necessary to describe only the chamber A shown at the left hand side of Fig. 1 and in Fig. 2, with the understanding that the description applies also to the right hand chamber A' in the illustrated example of the novel cabinet.

As shown in the drawing, an upright shaft 5 is journalled in the chamber A in any convenient manner so as to be fixed in position therein. A lower rack 4 is rotatably mounted on the shaft 5 and an upper rack 3 is supported in superimposed relation to the rack 4 so as to be rotatable on the shaft 5 independently of said rack 4; any suitable means is provided on the shaft 5 for rotatably maintaining the upper rack 3 in place thereon.

Each of the racks 3 and 4 is provided with a plurality of compartments for accommodating the commodity for which the cabinet is designed, which commodity in the present instance, is exemplified by ice cream cans which may be of existing standard capacity type or of varying dimensions as may be preferred.

In the example selected for purposes of description, the aforesaid compartments are shown in the form of containers designed to receive the ice cream cans or their equivalent, the upper rack 3 being provided with a different number of containers than the lower rack 4. The specific construction disclosed in Figs. 1 and 2 accordingly shows the upper rack 3 provided with three containers 3', and the lower rack 4 having four containers 4'. With the arrangement as shown in Fig. 1, two of the containers 3' are located in spaced relation on a common diametrical line at opposite sides of the shaft 5, while the third container 3' of the upper group is located between the other two containers 3' on a radial line extending outwardly from the shaft 5 at right angles to the first mentioned diametrical line; a relatively large open or free space thus exists between the first mentioned two containers 3' on the side of the shaft 5 opposite to that on which the other single container 3' is located. It will be understood that any other grouping of the containers 3' in any number may be substituted, as long as the arrangement includes the previously mentioned open or free space between any two adjacent containers 3'. In the illustrated construction, the containers 4' are located on the lower rack 4 in opposed pairs positioned respectively on diametrical lines which extend at right angles to each other through the axis of the shaft 5 in Fig. 1; the grouping may likewise be changed to provide any number of containers 4' on the lower rack 4. Without intending in any way to specifically limit the construction thereby, the containers 3' and 4' have been shown as integral parts of the racks 3 and 4 respectively; it will be understood that the specific form of the containers 3' and 4' may be otherwise than is illustrated in the drawing.

To enable the interior of the chamber A to be easily reached at will, said chamber is provided in its top with an opening 2, normally closed by a suitable cover 15 which preferably is removable when access to the inside of the cabinet is desired. The opening 2 is located in registry with the path of rotation of the containers 3' and 4', for instance, as illustrated in dotted lines at the right hand side of Fig. 1.

Refrigeration or other temperature variations in the interior of the chamber A may be provided in any conventional manner as, for instance, by means of an evaporator coil 6 having an inlet 7 for the refrigerant and an outlet 8 therefor. To avoid misunderstanding, it is to be understood that the description of the chamber A and its associated elements applies also to the chamber A' and its associated elements, and also that a complete cabinet embodying all of the novel features of the invention may consist only of the chamber A and the elements therein.

In practice if it is desired, for instance, to remove any of the ice cream cans in the containers 3', or any part of the contents of any of said cans, the upper rack 3 is simply rotated on the shaft 5 until the particular can containing, for instance, the desired flavor of ice cream, is beneath and in registry with the opening 2 from which the cover 15 has been previously removed. Obviously, at this stage, either the entire can may readily be lifted upwardly through the opening 2, or as much of the contents of said can as may be desired may be removed through said opening.

If it is desired to reach the lower containers 4', the upper rack 3 is rotated on the shaft 5 to bring the previously mentioned free space between two adjacent containers 3' into registry with the opening 2. The lower rack 4 is thereby made accessible through said opening 2 and free space, and accordingly may be independently rotated to bring the desired can into registry with the aligning free space and opening 2. The entire can or any part of the contents thereof may then be readily removed through the uncovered opening 2, as will be apparent.

With the described construction it is obvious that any of the containers 3' or 4' may easily be adjusted into registry with the opening 2 by a proper manipulation of the racks 3 and 4, or of the rack 3 alone, as the case may be.

The novel arrangement makes it possible to provide a cabinet of relatively small dimensions with improved capacity in which the elements are readily adjustable to bring all of the containers 3' and 4', or their equivalent, into easy accessibility through the uncovered opening 2, at will.

Practice has shown that the covered openings such as the opening 2, because of repeated removals of the covers 15 to permit access to the interior of the chamber such as A, are responsible for the greatest amount of heat transfer. In the novel cabinet these openings may be reduced to the smallest possible dimension so that heat transfer is reduced to a minimum and the power necessary to maintain the interior temperature of the cabinet at a given point is correspondingly reduced.

Various changes in the specific form shown and described may be made within the scope of the claims without departing from the spirit of the invention.

What I claim is:

1. A cabinet comprising an upright chamber having a stationary access opening in the top thereof, a movable closure for said opening, an upright shaft in said chamber, an upper rack rotatably mounted on said shaft and provided with a plurality of compartments and a constant free space vertically open and located between two adjacent compartments, said free space and said compartments being movable in a given direction with said upper rack into selective individual registry with said access opening, and a lower rack provided with a plurality of compartments movable therewith in a given direction into selective individual registry with said access opening and the aligning free space of said upper rack.

2. A cabinet comprising an upright chamber having a stationary access opening in the top thereof, a movable closure for said opening, an upright shaft in said chamber, a plurality of racks independently rotatable on said shaft in superimposed relation to each other, at least one upper rack being provided with a constant free space vertically open and adjustable in a given direction with said rack into registry with said access opening, at least one lower rack being independently adjustable in a given direction to selectively adjust any one of a plurality of predetermined portions thereof into registry with said access opening and the aligning free space of said upper rack.

3. A cabinet comprising an upright chamber having a stationary access opening in the top thereof, a movable closure for said opening, an upper rack rotatably mounted in said chamber and adjustable therein in a given direction to selectively bring predetermined portions of said rack into registry with said access opening, said upper rack having a constant free space vertically open and movable into alignment with said access opening, and a lower rack independently rotatable in a given direction in said chamber to selectively adjust any one of a plurality of predetermined portions of said lower rack into registry with said access opening and the aligning free space of said upper rack.

4. A cabinet comprising a chamber having a stationary access opening, a movable closure for said opening, a rack rotatably mounted in said chamber and adjustable therein to selectively bring predetermined portions of said rack into registry with said access opening, said rack having a constant free space vertically open and movable into alignment with said access opening, and a second rack in said chamber having an axis of rotation common to that of the first mentioned rack and independently rotatable in a given direction to selectively adjust any one of a plurality of predetermined portions of said second rack into registry with said access opening and the aligning free space of said first mentioned rack, the latter being located between the access opening and the second rack.

WILLIAM KERN.